United States Patent
Yuan et al.

(10) Patent No.: US 9,430,758 B2
(45) Date of Patent: Aug. 30, 2016

(54) USER INTERFACE COMPONENT WITH A RADIAL CLOCK AND INTEGRATED SCHEDULE

(71) Applicant: Cisco Technology, Inc., San Jose, CA (US)

(72) Inventors: Yao Yuan, Hangzhou (CN); Derek Liu, Hangzhou (CN); Jimmy Qu, Hangzhou (CN); Zhengjun Ye, Hangzhou (CN)

(73) Assignee: Cisco Technology, Inc., San Jose, CA (US)

( * ) Notice: Subject to any disclaimer, the term of this patent is extended or adjusted under 35 U.S.C. 154(b) by 234 days.

(21) Appl. No.: 14/155,428

(22) Filed: Jan. 15, 2014

(65) Prior Publication Data
US 2015/0160812 A1 Jun. 11, 2015

(30) Foreign Application Priority Data
Dec. 5, 2013 (CN) .......................... 2013 1 0643676

(51) Int. Cl.
*G06F 15/00* (2006.01)
*G06F 13/00* (2006.01)
*G06Q 10/10* (2012.01)
*G06F 15/02* (2006.01)

(52) U.S. Cl.
CPC ....... *G06Q 10/1095* (2013.01); *G06F 15/0266* (2013.01)

(58) Field of Classification Search
CPC .................... H04M 1/72544; H04M 1/72577
USPC .................... 715/733, 704, 867, 763, 834
See application file for complete search history.

(56) References Cited

U.S. PATENT DOCUMENTS

| 2009/0061837 A1* | 3/2009 | Chaudhri | G06F 3/0481 455/418 |
| 2010/0088597 A1* | 4/2010 | Shin | G06F 9/44505 715/704 |
| 2012/0046079 A1* | 2/2012 | Kim | H04M 1/72544 455/566 |

OTHER PUBLICATIONS

Chen, "Design of Calendar Clock Based on DS12C887 Chip," Computer and Information Science, vol. 1, No. 3, Aug. 2008, pp. 95-99.

* cited by examiner

Primary Examiner — Cao "Kevin" Nguyen
(74) Attorney, Agent, or Firm — Edell, Shapiro & Finnan, LLC

(57) ABSTRACT

Techniques are provided to obtain event scheduling information for one or more events occurring within a time period and to obtain a reference time. A composite display widget is generated comprising a radial time indicator for the reference time and a radial event indicator for a first event of the one or more events based on the scheduling information. The composite display widget is displayed. The composite display widget can be used to display time integrated with events scheduled from a plurality of scheduling applications to provide a small icon-based scheduling package that can be viewed at a glance by a user.

20 Claims, 8 Drawing Sheets

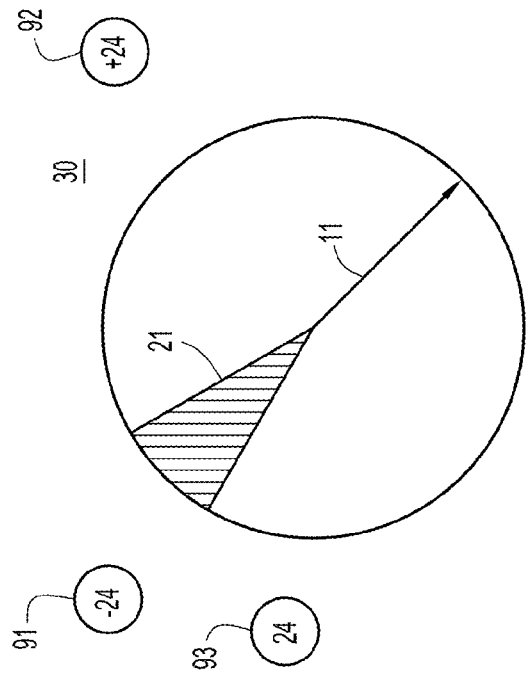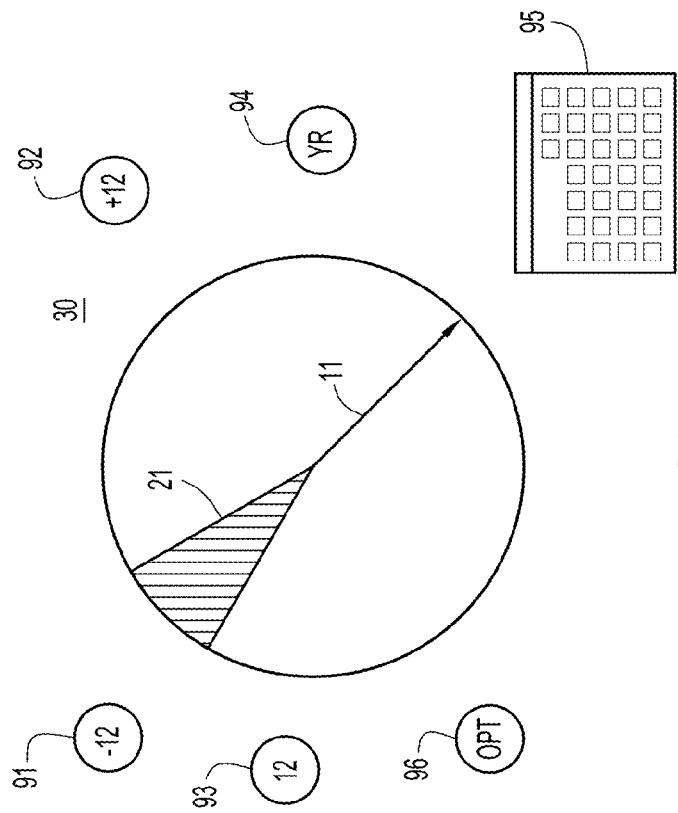
FIG.9B
FIG.9A

USER INTERFACE COMPONENT WITH A RADIAL CLOCK AND INTEGRATED SCHEDULE

TECHNICAL FIELD

The present disclosure relates to a user interface component or widget that integrates a clock function with one or more scheduling or calendaring functions.

BACKGROUND

Many aspects of an individual's life are governed by their schedule such as when to eat, attend the next meeting, go to a doctor's appointment, etc. Many individuals may use a paper based scheduler or an electronic (software-based) scheduler, while employers may use employee scheduling software. To further the mix, teleconferencing software and applications, also have scheduling mechanisms. Each of the software programs mentioned above has their own user interfaces, features and nuances.

BRIEF DESCRIPTION OF THE DRAWINGS

FIGS. 9A and 9B depict examples of widgets that may be added to a composite display widget to provide advance features according to the techniques described herein.

DESCRIPTION OF EXAMPLE EMBODIMENTS

Overview

Presented herein are techniques to obtain event scheduling information for one or more events occurring within a time period and to obtain a reference time. A composite display widget is generated comprising a radial time indicator for the reference time and a radial event indicator for a first event of the one or more events based on the scheduling information. The composite display widget is displayed. The composite display widget can be used to display time integrated with events scheduled from a plurality of scheduling applications to provide a small icon-based scheduling package that can be viewed at a glance by a user.

Example Embodiments

Many scheduling applications are developed with specific applications in mind. For example, a scheduling application for factory workers may help to schedule a large number of workers to perform shift work along well defined schedules, whereas a flight scheduling application for military or commercial flight crews may operate by integrating customized individual schedules with asynchronous flight schedules, even when some individuals may be "on call" or "scrambled" into immediate action.

In current scheduling systems or applications, any given scheduling application may provide varying levels of scheduling display granularity. For example, hourly, weekly or monthly displays may be presented to a user for a user to see and/or schedule an event, appointment or other block of time. Furthermore, these scheduling applications require a large portion of a given user display area so that a user can actually read their schedules. These scheduling applications do not necessarily provide a complete schedule that integrates plural scheduling applications.

Figure 1A:
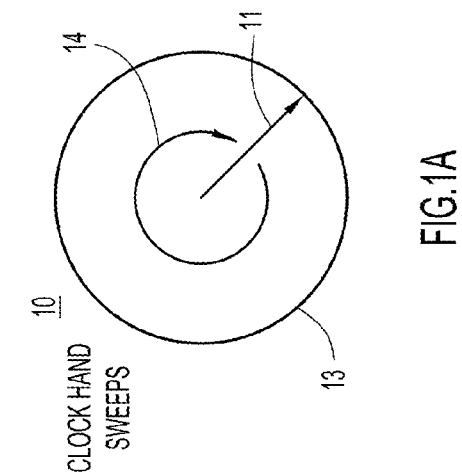
FIGS. 1A, 1B and 1C show example radial or analog clocks with an hour hand, where each clock face has a different bezel configuration for integration with a scheduling mechanism according to the techniques described herein.
Figure 1B:
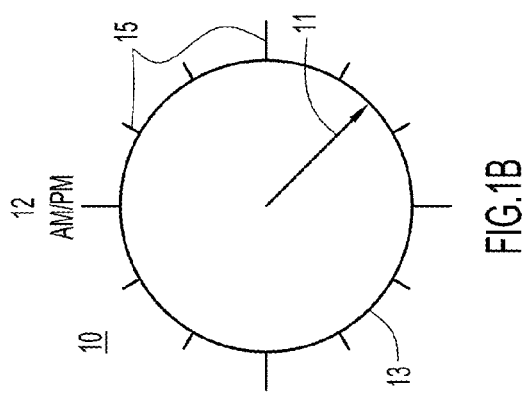
Figure 1C:
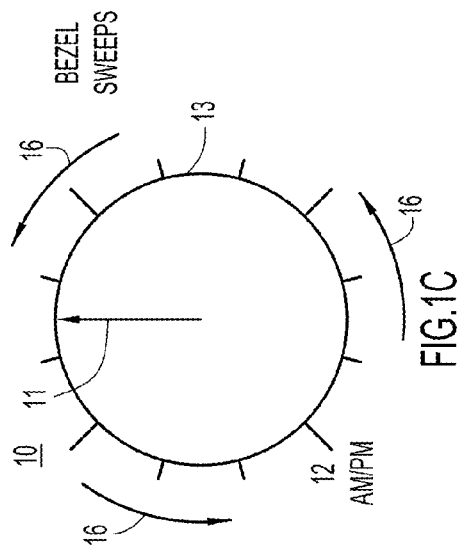

FIGS. 1A, 1B and 1C show example radial or analog clocks with an hour hand, where each clock has a different bezel configuration for integration with a scheduling mechanism according to the techniques described herein. Referring first to FIG. 1A, a clock icon is shown generally at reference numeral 10 that may be used as an icon on a user interface display. The clock icon 10 includes an outer ring or bezel 13 and an hour hand 11. The bezel 13 depicts 360 degrees (or $2\pi$ radians) of circumference that are available for a radial or analog clock display. Although depicted as a circle, bezel 13 may be displayed as a square, oval, rectangle or other shapes that may facilitate an artistic style for the clock icon 10.

The hour hand 11 is depicted as a vector with an origin at the center of the circle and an arrowhead termination point at the outermost radius of the bezel 13. In this example, if clock icon 10 depicts a 12-hour period with, e.g., high noon at the top, then hour hand 11 in its current position approximates the 4:30 post meridiem (p.m.) time. As in a typical clock display, hour hand 11 will sweep in a clockwise direction with the passage of time. In accordance with the techniques described herein, clock icon 10 displays a "look ahead" or forward looking time period 14 depicted by a circular arrow. As previously described, if clock icon 10 displays a 12-hour period, then look-ahead period 14 is 12 hours. The significance of the look-ahead time period is described herein with reference to various other figures and it should be understood that the look-ahead time period varies depending upon the application, e.g., a 12-hour clock, a 24-hour clock, a sidereal clock, lunar/solar clocks or other clocks for a given clock configuration.

FIG. 1B depicts clock icon 10 with an enhanced bezel ring 13. Bezel 13 includes hour or tick marks 15. As shown in FIG. 1B, bezel tick marks 15 include elongated marks at the 9, 12, 3, and 6 o'clock positions with shorter marks at the lesser-considered clock positions. Any number of marks may be used depending on the clock style, definition, or time range, including, e.g., a single tick mark at the 12 o'clock (a.m. or p.m.) position.

Referring to FIG. 1C, clock icon 10 from FIG. 1B is depicted in a "clock up" or "North up" configuration in which hour hand 11 remains fixed at the "12 o'clock" position. In this example, instead of the hour hand 11 sweeping clockwise relative to the bezel 13, the bezel 13 rotates counter clockwise relative to the fixed position hour hand 11 as indicated by the arrows at reference numerals 16. Accordingly, the 4:30 clock position of hour hand 11 shown in FIGS. 1A and 1B is shown at the 12 o'clock position as viewed in FIG. 1C. The bezel 13, in the rotated position, still depicts hour hand 11 at the 4:30 hour while the 12 a.m./p.m. position is shown in a relative position corresponding to the 7:30 clock position.

Figure 2A:
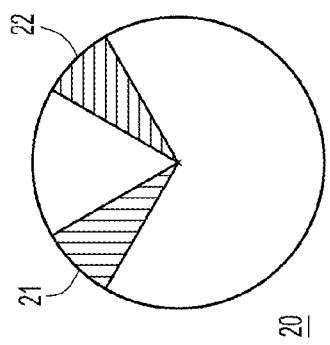
FIGS. 2A and 2B show an example scheduling mechanism in the form of scheduling pie charts for integration with a clock face according to the techniques described herein, where each wedge of pie depicts a scheduled event or free time that is available for scheduling.
Figure 2B:
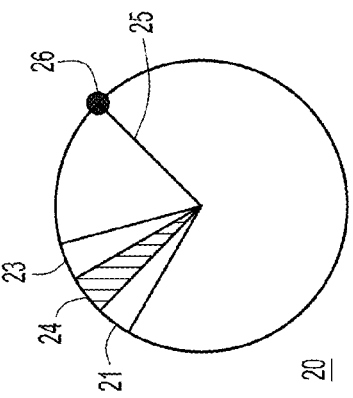

FIGS. 2A and 2B show example displays associated with a scheduling mechanism in the form of scheduling pie charts. Scheduling pie charts may be integrated with a clock face according to the techniques described herein, e.g., clock icons 10 depicted in FIGS. 1A, 1B and 1C. FIG. 2A depicts two events 21 and 22 that were scheduled using one or more scheduling applications, e.g., OUTLOOK™ or iCAL™. The events 21 and 22 are depicted as wedges of a pie in the pie chart 20 relative to a given clock's timing and may be referred to herein as "event indicators." The width or radial number of degrees occupied by each pie wedge indicates a duration of a particular event. In this example, each of events 21 and 22 depicts an approximate duration of one hour, e.g., wedge 21 indicates that the associated event occurs from approximately from 10 to 11 am. Each event wedge may be delineated by filling the wedge with different indicators such as fill colors, or different hash marks or textures. Empty spaces in the pie chart 20 may indicate unscheduled or free time that is available for scheduling.

FIG. 2B shows example variations of scheduling displays. In a first variation, an event 23 is shown overlapping event 21 from FIG. 2A. Events 21 and 23 may be scheduled independently, i.e., using the same or different scheduling applications. The time period for the event overlap is shown at reference numeral 24. The software application or process that generates pie chart 20 may include features to assess information associated with each appointment. For example, event 21 may be a doctor's appointment with the possibility of running over or finishing early, while event 23 may be a flexible lunch date. Thus, event 23 may be considered flexible with respect to event 21. However, if event 23 were also a doctor's appointment, the displaying application may want to consider additional information. By way of example, the displaying application may consider the location of one appointment relative to another and how long it will take to travel from appointment 21 to appointment 23. In another example, appointments 21 and 23 may have different priorities.

In this regard, appointment 21 may be routine while appointment 23 may be of a higher priority such as a cancer screening or other sophisticated diagnostic test. Accordingly, the pie chart 20 may include features to alert the user of such priorities, e.g., by the use of color-coding. As such, overlap areas may also include color-coding such as the color red to indicate that one appointment cannot be changed, missed or modified; or the color green to indicate a highly flexible appointment. The overlap area 24 may include a color combination (or hashing combination) of appointment 21 and 23, use transparency techniques or assume the highest priority indication.

FIG. 2B includes a reminder type of event shown at reference numeral 25. Reminder events are events without a specific duration. For example, a reminder event may indicate a time to take one's medicine, go to the airport, plan a meeting, etc. In other words, events without a specific duration may be displayed as a single line 25. In this example, a small black circle or dot 26 is placed at the end of reminder 25 to provide a visual cue or difference from the hour hand 11. Other visual cues may be used, e.g., thicker/thinner lines, colors and the like. The dot 26 may be color coded to indicate a type of reminder or a priority of a reminder.

Figure 3:
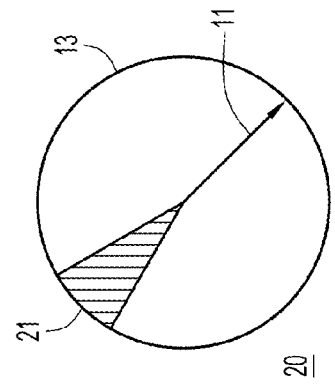
FIG. 3 shows an example of the clock face from FIG. 1A combined with a portion of the scheduling pie chart from FIG. 2A to form a composite display widget that integrates a clock with a schedule.

Turning to FIG. 3, an example of the clock icon 10 from FIG. 1A is shown combined with event 21 from the scheduling pie chart 20 depicted FIG. 2A to form an integrated clock display or scheduler 30, referred to herein as a composite display widget. For example, the clock bezel 13 may be generated or retrieved from memory in the form of a display icon, and hour hand 11 is generated from a time parameter, e.g., a current time, for display as an icon overlay on top of clock icon 10. Event 21 is also generated for display as an icon overlay on top of clock icon 10. The combination of bezel 13, hour hand 11 and event 21 form the composite display widget 30. The order of generating or retrieving icons or the overlay order is a matter of choice. In another example, these icons may be copied or generated with a graphics memory for display on a user interface.

In order to generate event indicator 21, software running on a user device may query various scheduling or calendar application for events that may be displayed according to the current configuration of the composite display widget 30. By way of example, if a user is using an ANDROID™ based smart phone, the software may query a local ANDROID™ based scheduler or query a remote OUTLOOK™ server in order to obtain available events for display. In other examples, the schedulers or calendars may be configured to periodically synchronize with the user's phone or other device.

Figure 4A:
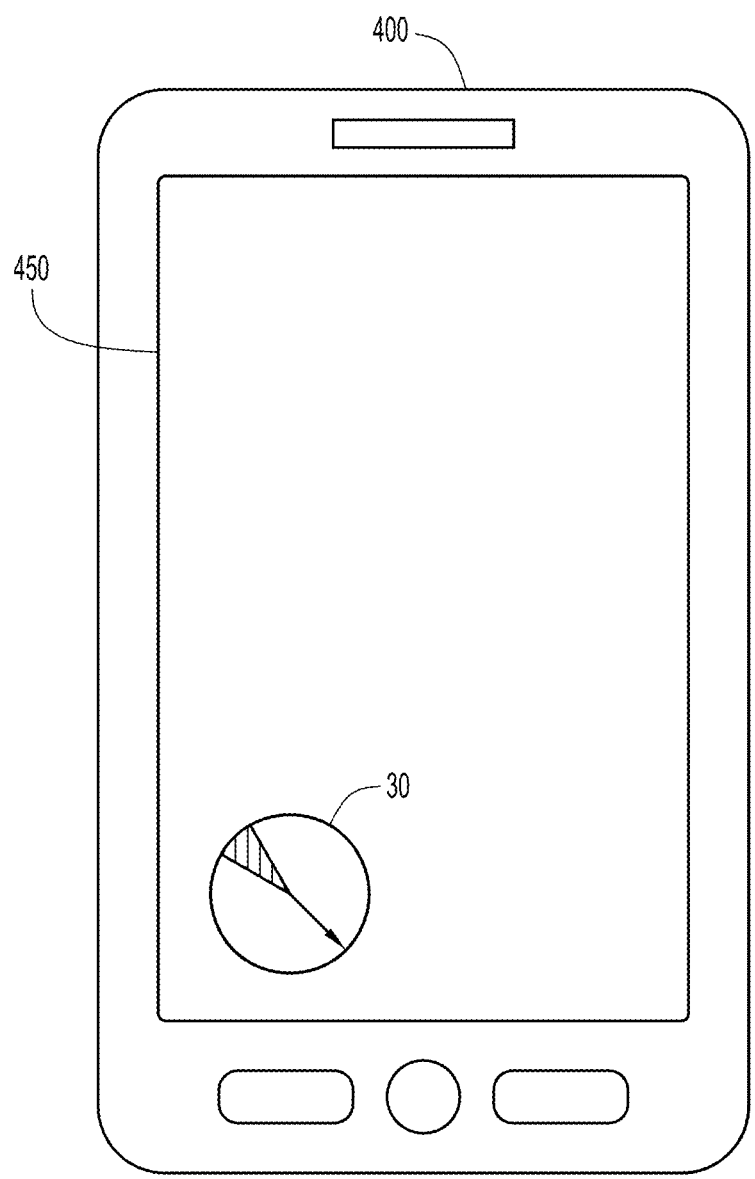
FIG. 4A depicts an example of a device such as a mobile device that is configured to display a composite display widget.

Referring to FIG. 4A, an example of a device such as a mobile device is depicted that is configured to display a composite display widget. FIG. 4A depicts a mobile device 400, e.g., a smart phone, tablet, etc. The mobile device 400 includes a touch screen display 450 that displays composite display widget 30. The composite display widget 30 can be touched with a finger or a stylus to access or display the various information provided by the composite display widget 30. Additional features for the composite display widget 30 are described hereinafter in connection with FIGS. 6A-9B.

Figure 4B:
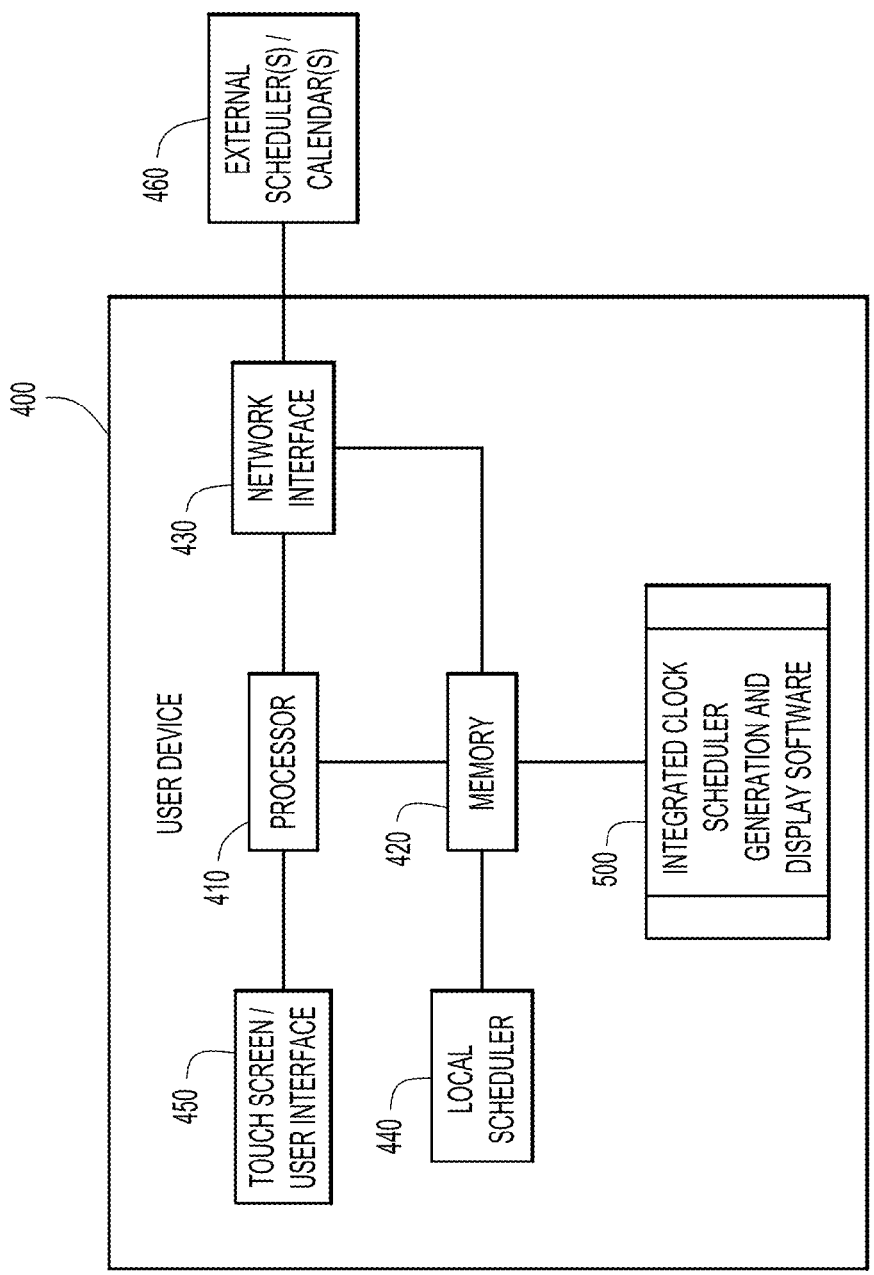
FIG. 4B depicts example components of the device from FIG. 4A including a processor and software configured to generate and display a composite display widget.

Turning now to FIG. 4B, an example functional block diagram for user device 400 is depicted with several electronic components. The user device 400 includes one or more processors 410, memory 420, a network interface unit 430, and the touch screen/user interface 450 (FIG. 4A). The processor 410 may be a microprocessor or microcontroller configured to perform the operations described herein for software process 500. The network interface unit 430 facilitates network communications between the user device 400 and external networks to exchange information with external schedulers and or calendars 460. The processor 410 executes instructions associated with software stored in memory 420. Specifically, the memory 420 stores integrated clock scheduler generation and display software 500 that, when executed by the processor 410, causes the processor 410 to perform the operations for the controller described herein with respect to the various figures. The memory 420 also stores information for a local scheduler/calendar 440 if installed on the user device 400. The memory 420 also stores preferences associated with the composite display widget.

The memory 420 may comprise read only memory (ROM), random access memory (RAM), magnetic disk storage media devices, optical storage media devices, flash memory devices, electrical, optical, or other physical/tangible memory storage devices. In general, the memory 420 may comprise one or more tangible (non-transitory) computer readable storage media (e.g., a memory device) encoded with software comprising computer executable instructions and when the software is executed (by the processor 410), it is operable to perform the operations described herein. For example, software 500 generates a composite display widget or icon for display on user interface 450.

Figure 5:
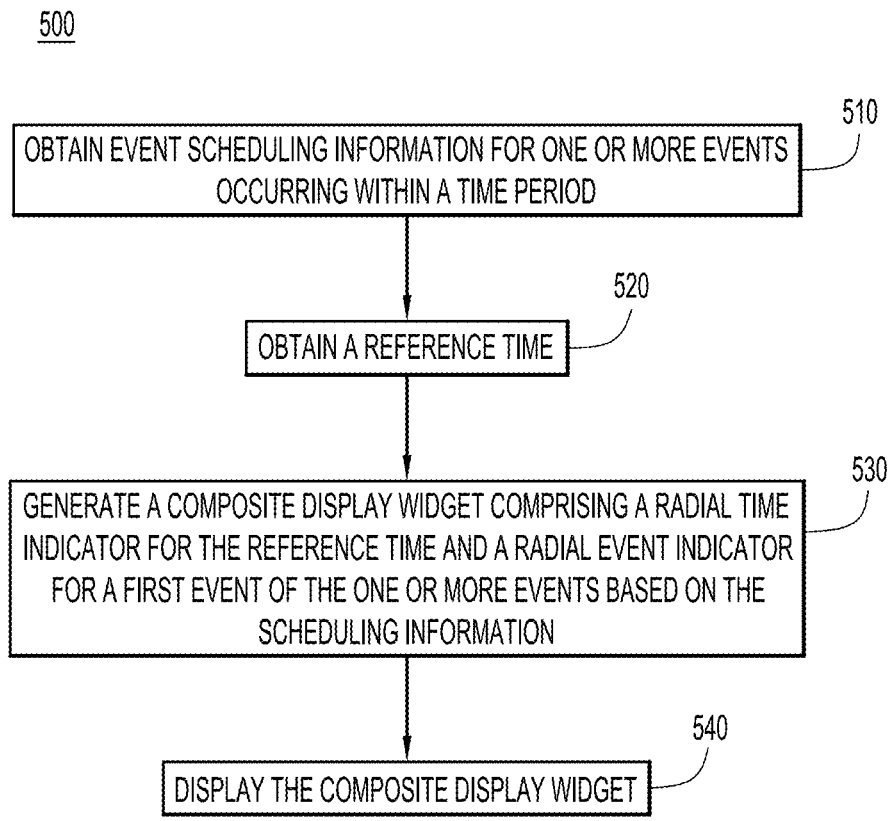
FIG. 5 is an example of a process flowchart for generating a composite display widget.

Referring to FIG. 5, a flow chart depicting the operations performed by the user device is now described for executing integrated clock scheduler generation and display software 500. At 510, event scheduling information is obtained for one or more events occurring within a time period. The events may be of various designs, e.g., reminders or events with various attributes such a duration, links to other events, applications, groups, or individuals, to name a few.

At 520, a reference time is obtained. A reference time may be defined by the application for which the composite display widget is employed. For example, many applications may not be based on an Earth based clock, associated with a particular time zone or are coordinated across time zones. For example, researchers working across time zones or crewmembers of the International Space Station (ISS), or international flight applications may use Greenwich Mean Time (GMT) as a reference. Other reference times may included Lunar or Solar cycle start times, or other non-Earth based calendar or clock references.

At 530, a composite display widget, e.g. composite display widget 30, is generated comprising a radial time indicator for the reference time and a radial indicator for a first event of the one or more events based on the scheduling information. For simplicity, the radial time indicator may be a clock hour hand and the event may be displayed as a pie wedge where the width of the wedge indicates a duration across the face of a composite display widget. At 540, the composite display widget is displayed.

Figure 6A:
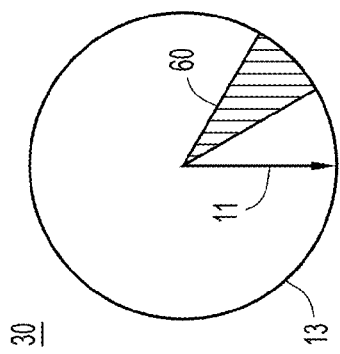
FIGS. 6A, 6B and 6C depict a series of clock faces in which an event scheduled beyond the time range of the clock is swept into view by the clock's hour hand as the event comes into the clock's time range with the passage of time.
Figure 6B:
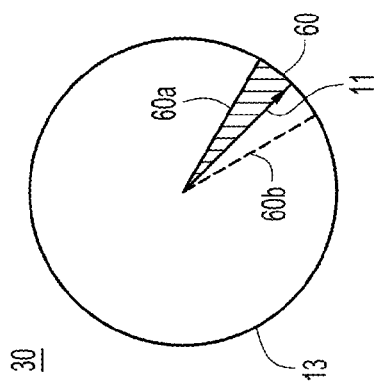
Figure 6C:
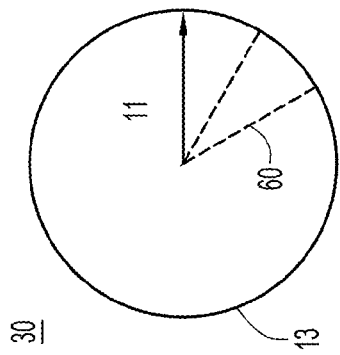

FIGS. 6A, 6B and 6C depict a series of clock faces progressing in time. In FIG. 6A, an event 60 is scheduled beyond the defined time range of the clock. In FIGS. 6B and 6C, event 60 is swept into view by the clock's hour hand as the event comes into the clock's time range as time progresses. For ease of illustration, it can be assumed that the composite display widget 30 in these figures has a forward-looking time range of 12 hours. In FIG. 6A, hour hand 11 can be assumed to be at the 3 ante meridiem (a.m.) hour (or complementary 3 p.m. hour). An event 60 is displayed as a dashed wedge, which indicates that the event 60 is not within the look-ahead time range. For example, event 60 may occur in time from 4-5 p.m., which is beyond the 12-hour window available from 3 a.m.

Briefly, as described herein, a dashed wedge or dashed line event reminder indicates a time that is not within a look-ahead period within the configured time range of the composite display widget 30. For example, the user or administrator may designate or define a time range of ±3 hours, +6 hours and −2 hours, or other range that indicates whether a future or past event may be displayed to a user within the composite display widget 30. Other out of range indicators may be used such as event icon fade-away for past events or fade-in as an event starts to come within the look-ahead time range.

FIG. 6B indicates the passage of time such that the hour hand 11 is now at the 4:30 AM position. Event 60 is now split by hour hand 11 into two parts 60a and 60b. Part 60a has come into view by way of the passage of time indicated by hour hand 11, and is shown as a solid lined wedge portion filled with hashing. Part 60b has yet to come into view by way of the passage of time indicated by hour hand 11, and is shown as a dashed lined wedge portion. FIG. 6C indicates the passage of time such that the hour hand 11 is now at the 6:00 a.m. position. Event 60 is now fully within the 12-hour window defined for the composite display widget 30. Thus, the time progression depicted as time progresses across FIG. 6A to FIG. 6B, and subsequently to FIG. 6C, is portrayed by solid lined event 60 when fully in view.

Figure 7A:
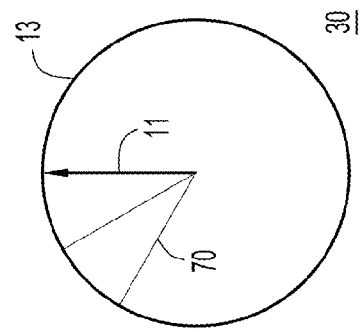
FIGS. 7A, 7B and 7C depict a series of clock faces in which an event scheduled within the current time range of the clock is swept out of view by the clock's hour hand as time progresses through the event with the passage of time.
Figure 7B:
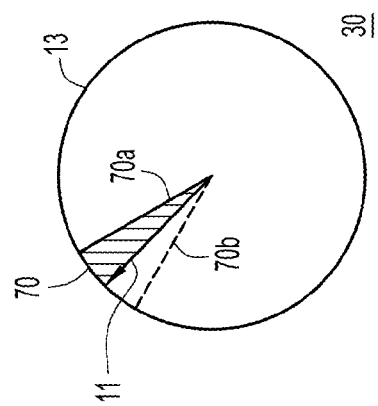
Figure 7C:
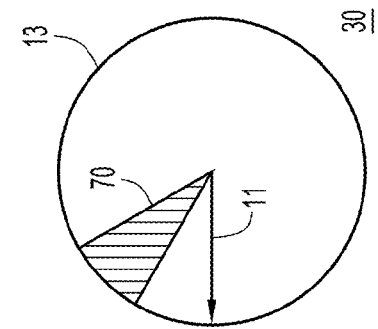

FIGS. 7A, 7B and 7C depict a series of clock faces progressing in time in which an event scheduled within the current time range of the clock is swept out of view by the clock's hour hand as time progresses through the event and past the event. For ease of illustration, it can be assumed that the composite display widget 30 in these figures has a forward-looking time range of 12 hours. In FIG. 7A, hour hand 11 can be assumed to be at the 9 a.m. hour (or complementary 9 p.m. hour). An event 70 is displayed as a solid lined wedge, which indicates that the event 70, scheduled from 10-11 a.m., is within the look-ahead time range.

FIG. 7B indicates the passage of time such that the hour hand 11 is now at the 10:30 a.m. position. Event 70 is now split by hour hand 11 into two parts 70a and 70b. Part 70b has passed out of view by way of the passage of time indicated by hour hand 11, and is shown as a dashed lined wedge portion (or eliminated from the display altogether). Part 70a is in view and has yet to go out of view by way of the passage of time indicated by hour hand 11, and is shown as a remaining solid lined wedge portion filled with hashing. FIG. 7C indicates the passage of time such that the hour hand 11 is now at the Noon position and event 70 is now fully out of view of the 12 hour window defined for the composite display widget 30. Once completed, event 70 may be displayed within the composite display widget 30 as a residual or faded icon, or not at all. Thus, in the time progression depicted as time progresses across FIG. 7A to FIG. 7B, and subsequently to FIG. 7C, event 70 is not portrayed or potentially displayed for a period of time using the fade away techniques described above or using a thin dashed figured as shown in FIG. 7C.

FIGS. 8A, 8B, 8C and 8D depict a series of composite display widgets 30 with various features that may be enabled according to the techniques described herein. As viewed in FIG. 8A, hour hand 11 is approaching or has reached an event, e.g., event 21 as depicted in FIGS. 2A, 2B, and FIG. 3. Once the hour hand 11 as defined by a given time reference or parameter, e.g., a current time, has reached a predetermined time point, additional options 80 may come into view. In this example, options 81 and 82 may be made to come into view. Option 81 provides a user with the option of joining a meeting/event 21 or opening event 21. For example, to join a meeting, the user may "tap" option 81, or to open the event, the user may "double tap" option 81 with a finger or stylus. Option 82 indicates that a user may cancel or not join a given meeting such as event 21.

Figure 8B:
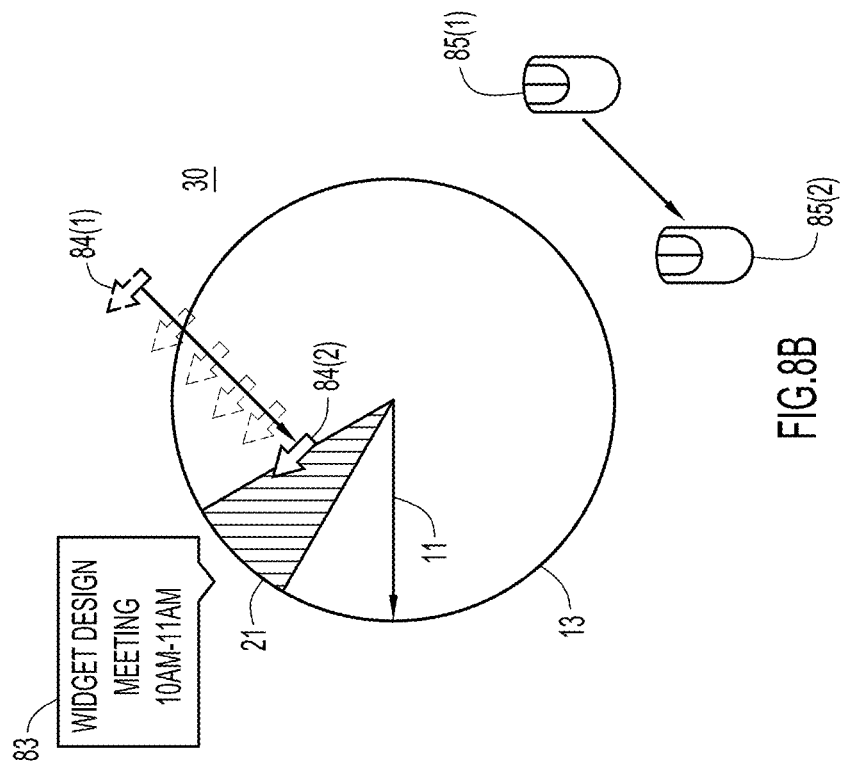
FIGS. 8A, 8B, 8C and 8D depict a series of a composite display widget with various features that may be enabled.
Figure 8A:
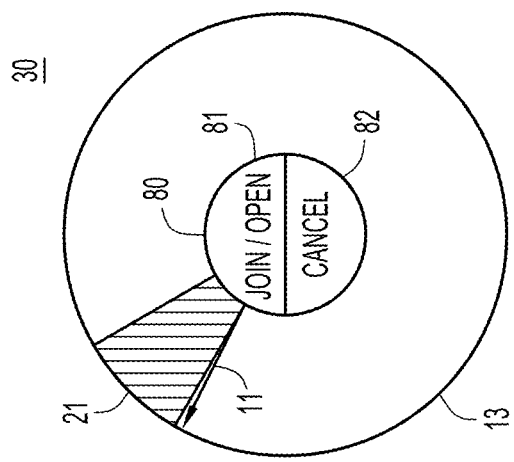

FIG. 8B indicates interactive options for a user wishing to interact with widget 30. For example, when a mouse pointer "mouses" over an event, a popup window may appear. In this example, the user moves a mouse from position 85(1) to position 85(2) and an associated mouse pointer moves from position 84(1) to 84(2). Upon reaching an event indicator, e.g., for event 21, or after a short delay, a pop-up event description 83 may be presented on the display such as touch screen 450 (FIG. 4A). Pop-up description 83 may also be displayed if a user taps or double-taps the event indicator.

Figure 8D:
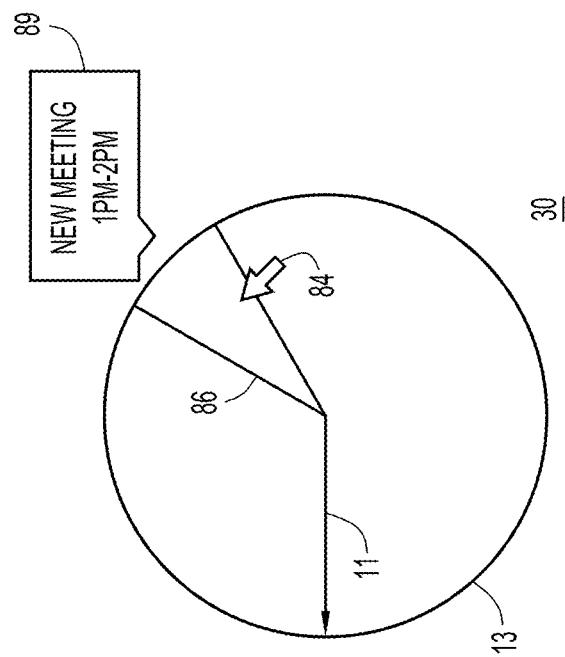
Figure 8C:
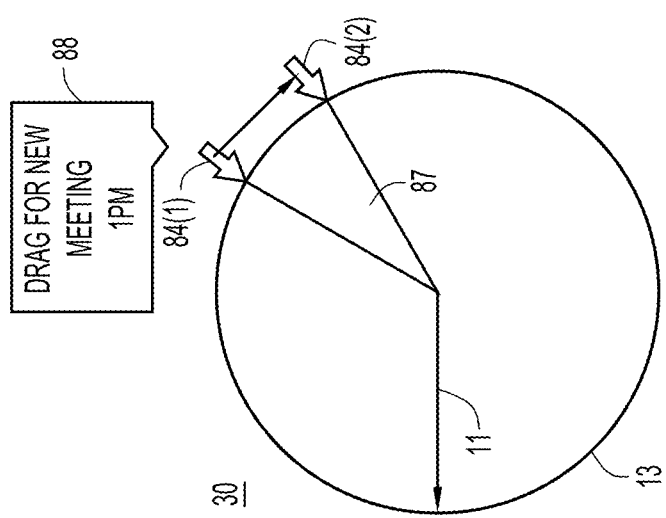

FIGS. 8C and 8D depict an example technique that may be used to create a new event 87. In FIG. 8C, a user, by way of a mouse, fingertip or stylus, clicks and holds the cursor at position 84(1). After a brief delay, a pop-up message 88 appears. Pop-up message 88 provides the user with instructions for creating a new meeting with a start time of 1 p.m., the 1 p.m. start time corresponding to position 84(1). At this point, the user can release the cursor and the pop-up 88 is removed from the display, or the user can drag the cursor to position 84(2) to create a meeting with an indicated duration displayed by radial time indicator 87. After dragging the cursor to position 84(2), a new meeting is created.

The new meeting is depicted in FIG. 8D as a created event with radial time indicator 86. At this point, the user can mouse over the radial time indicator 86 as indicated by cursor 84. A pop-up message 89 may appear on the display that indicates that an untitled new meeting has a duration from 1-2 p.m. The user may double click radial time indicator 86 or click pop-up message 89 to edit meeting parameters, add attendees or change a default scheduling application.

FIGS. 9A and 9B depict examples of icons or widgets that may be added to the composite display widget 30 to provide advance features according to the techniques described herein. In FIG. 9A, composite display widget 30 includes 12/24 hour toggle button 93 that indicates a look-ahead time range of 12 or 24 hours. The 12/24 hour toggle button or icon 93 currently indicates a look-ahead time of 12 hours. The 12/24 hour toggle icon 93 operates in conjunction with a previous 12 hours icon 91 and a next 12 hours icon 92. Icons 91 and 92 can be used to view 12-hour periods that have already past or to look ahead even further than the current look-ahead time. In this example, each time icons 91 and 92 are clicked by the user, the reference time for the composite display widget 30 is decremented or incremented by 12 hours by, e.g., integrated clock scheduler generation and display software 500.

Referring to FIG. 9B, a user can click 12/24 hour toggle button 93 to change the look-ahead time range from 12 to 24 hours. Accordingly, icons 91 and 92 are redrawn to indicate that the reference time for the composite display widget 30 is decremented or incremented by 24 hours. It is to be understood that various increments of time may be used or configured for any of icons 91, 92 and 93.

Referring again to FIG. 9A, the composite display widget 30 may also include a year (YR) icon 94, a calendar icon 95 and an options (OPT) icon 96. The YR icon 94 may be used to select a display year and the calendar icon 95 may be used to select a display day and month. Options icon 96 may be used to, among other things, configure user preferences. For example, the time increments for any of icons 91, 92 and 93 may be configured. The user may configure a standard clock or a North up clock, color preferences and themes. In this regards, it should be understood that many conventional application, display or operating system parameters may be configured including, e.g., scheduling and notification servers. The available user configurable options may also be restricted by a system administrator.

In summary, techniques are presented herein to obtain event scheduling information for one or more events occurring within a time period and to obtain a reference time. A composite display widget is generated comprising a radial time indicator for the reference time and a radial event indicator for a first event of the one or more events based on the scheduling information. The composite display widget is displayed. The radial time indicator may be periodically rotated to indicate a passage of time.

A clock bezel ring may be generated that is configured to at least partially surround the radial time indicator and the radial event indicator, e.g., bezel ring 13 shown in FIG. 1A. The clock bezel ring may include generating one or more radial time markers, e.g., bezel tick marks 15 (FIG. 1B), indicating one or more clock time positions. The radial time indicator may be generated at a fixed time position, and the composite display widget including the clock bezel ring may be rotated relative to the fixed time indicator to indicate a passage of time, e.g., as shown in FIG. 1C.

The composite display widget may be generated with a given a time range, where a time range defined for the first event is not within the given time range, the radial event indicator is swept into the display of the composite display widget, e.g., by the hour hand, as the time range of the first event comes within the given time range for the composite display widget with the passage of time. In addition, when an entire time range defined for the first event is within the given time range, the radial event indicator is swept out of the display of the composite display widget, e.g., by the hour hand, as the time range of the first event passes out of the given time range for the composite display widget with the passage of time.

A radial event indicator may be generated for a second event of the one or more events based on the scheduling information and the radial event indicator for a second event is displayed as part of the composite display widget. If a time range defined for the second event overlaps a time range defined for the first event, an overlap indicator associated with the radial event indicators for the first and the second events may be generated that indicates the overlapping time range. The overlap indicator may be displayed as part of the composite display widget.

One or more icons associated with the composite display widget may be generated for configuring a display, clock parameters for the composite display widget and interfaces to one or more scheduling applications for obtaining the event scheduling information. Furthermore, user activity associated the composite display widget may be detected and the composite display widget may be modified based on the user activity.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method comprising:
obtaining event scheduling information for one or more events occurring within a time period;
obtaining a reference time;
generating a composite display widget comprising a radial time indicator for the reference time and a radial event indicator for a first event of the one or more events based on the scheduling information; and
displaying the composite display widget,
wherein the radial event indicator is in the shape of a pie wedge that spans a period of time that is less than 12 hours and that is consistent with the event scheduling information.

2. The method of claim 1, wherein generating the composite display widget comprises periodically rotating the radial time indicator to indicate a passage of time.

3. The method of claim 1, wherein generating a composite display widget comprises generating a clock bezel ring configured to at least partially encapsulate the radial time indicator and the radial event indicator.

4. The method of claim 3, wherein generating the clock bezel ring comprises generating one or more radial time markers indicating one or more clock time positions.

5. The method of claim 4, wherein generating the composite display widget comprises generating the radial time indicator at a fixed time position, and further comprising:
rotating the composite display widget including the clock bezel ring relative to the fixed time indicator to indicate a passage of time.

6. The method of claim 1, wherein generating the composite display widget comprises generating the composite display widget with a given time range, and wherein a time range defined for the first event is not within the given time range, the method further comprising sweeping the radial event indicator into the display of the composite display widget as the time range of the first event comes within the given time range for the composite display widget with the passage of time.

7. The method of claim 1, wherein generating the composite display widget comprises generating the composite display widget with a given time range, and wherein an entire time range defined for the first event is within the given time range, the method further comprising sweeping the radial event indicator out of the display of the composite display widget as the time range of the first event passes out of the given time range for the composite display widget with the passage of time.

8. The method of claim 1, further comprising:
generating a radial event indicator for a second event of the one or more events based on the scheduling information; and
displaying the radial event indicator for a second event as part of the composite display widget.

9. The method of claim 8, wherein a time range defined for the second event overlaps a time range defined for the first event, and further comprising:
generating an overlap indicator associated with the radial event indicators for the first and the second events that indicates the overlapping time range; and
displaying the overlap indicator as part of the composite display widget.

10. The method of claim 1, further comprising:
generating one or more icons associated with the composite display widget for configuring a display, clock parameters for the composite display widget and interfaces to one or more scheduling applications for obtaining the event scheduling information.

11. The method of claim 1, further comprising:
detecting user activity associated the composite display widget; and
modifying the composite display widget based on the user activity.

12. An apparatus comprising:
a user interface display; and
a processor coupled to the user interface display, the processor configured to:
obtain event scheduling information for one or more events occurring within a time period;
obtain a reference time;
generate a composite display widget comprising a radial time indicator for the reference time and a radial event indicator for a first event of the one or more events based on the scheduling information; and
display the composite display widget,
wherein the radial event indicator is in the shape of a pie wedge that spans a period of time that is less than 12 hours and that is consistent with the event scheduling information.

13. The apparatus of claim 12, wherein the processor is configured to generate one or more of a clock bezel ring configured to at least partially surround the radial time indicator and the radial event indicator, and one or more radial time markers indicating one or more clock time positions.

14. The apparatus of claim 12, wherein the processor is further configured to:
sweep the radial event indicator into the display of the composite display widget as the time range of the first event comes within the given time range for the composite display widget with the passage of time; and
sweep the radial event indicator out of the display of the composite display widget as the time range of the first event passes out of the given time range for the composite display widget with the passage of time.

15. The apparatus of claim 12, wherein the processor is configured to:
generate a radial event indicator for a second event of the one or more events based on the scheduling information;
display the radial event indicator for a second event as part of the composite display widget;
wherein when a time range defined for the second event overlaps a time range defined for the first event;
generate an overlap indicator associated with the radial event indicators for the first and the second events that indicates the overlapping time range; and
display the overlap indicator as part of the composite display widget.

16. The apparatus of claim 12, wherein the processor is further configured to:
detect user activity associated the composite display widget; and
modify the composite display widget based on the user activity.

17. One or more non-transitory computer readable storage media encoded with software comprising computer executable instructions and when the software is executed operable to:
obtain event scheduling information for one or more events occurring within a time period;
obtain a reference time;
generate a composite display widget comprising a radial time indicator for the reference time and a radial event indicator for a first event of the one or more events based on the scheduling information; and
display the composite display widget,
wherein the radial event indicator is in the shape of a pie wedge that spans a period of time that is less than 12 hours and that is consistent with the event scheduling information.

18. The non-transitory computer readable storage media of claim 17, further comprising instructions operable to:
sweep the radial event indicator into the display of the composite display widget as the time range of the first event comes within the given time range for the composite display widget with the passage of time; and sweep the radial event indicator out of the display of the composite display widget as the time range of the first event passes out of the given time range for the composite display widget with the passage of time.

19. The non-transitory computer readable storage media of claim 17, further comprising instructions operable to:
generate a radial event indicator for a second event of the one or more events based on the scheduling information;
display the radial event indicator for a second event as part of the composite display widget;
wherein when a time range defined for the second event overlaps a time range defined for the first event:
generate an overlap indicator associated with the radial event indicators for the first and the second events that indicates the overlapping time range; and
display the overlap indicator as part of the composite display widget.

20. The non-transitory computer readable storage media of claim 19, further comprising instructions operable to:
detect user activity associated the composite display widget; and
modify the composite display widget based on the user activity.

* * * * *